July 20, 1965    R. J. NEIDIGH    3,195,388
PORTABLE MACHINE TOOL
Filed Nov. 26, 1962    2 Sheets-Sheet 1
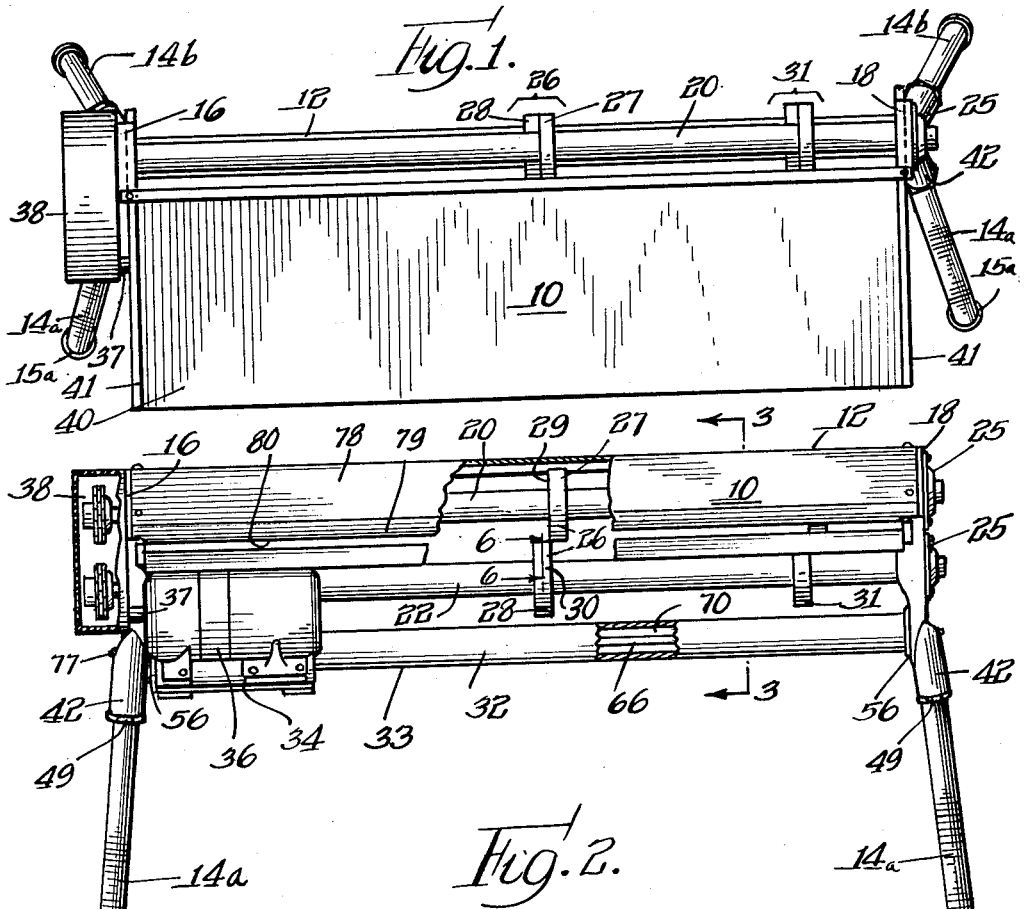
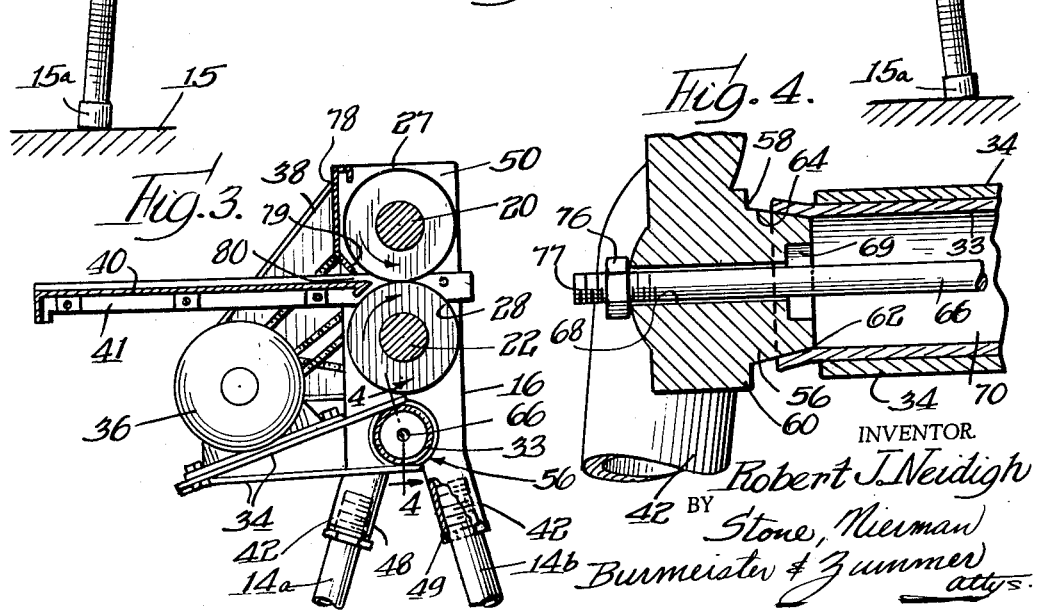
INVENTOR.
Robert J. Neidigh
BY Stone, Nieman
Burmeister & Zummer
attys.

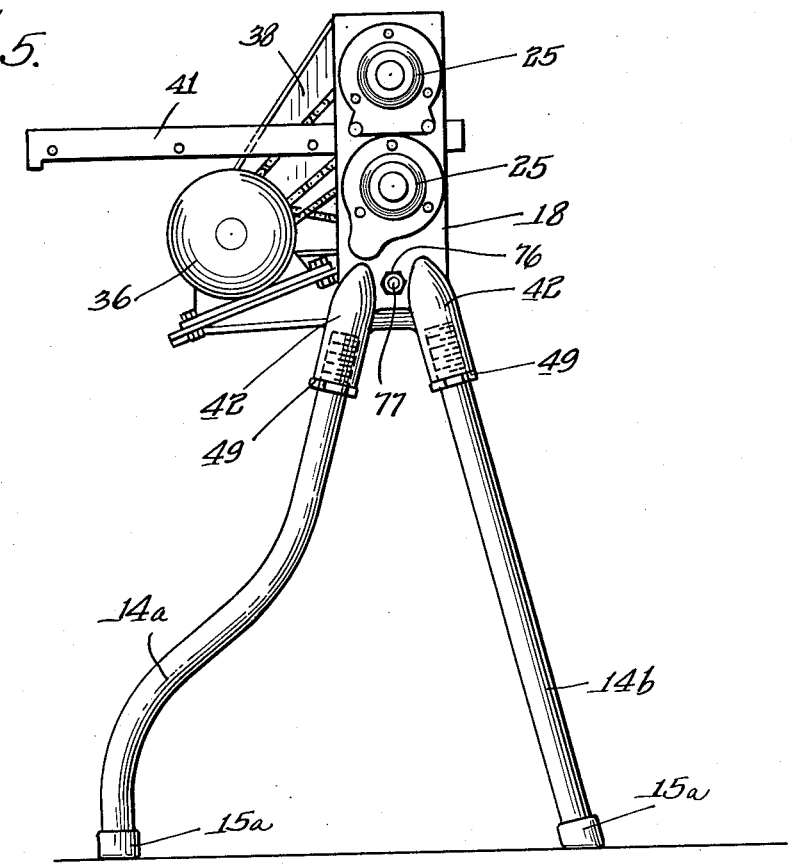
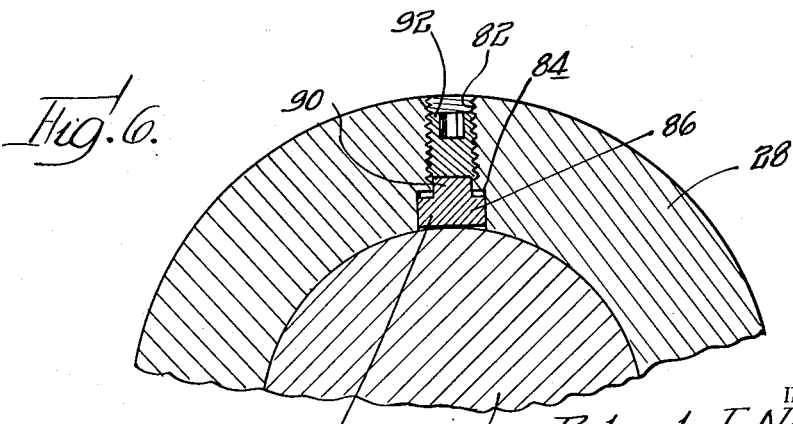

3,195,388
PORTABLE MACHINE TOOL
Robert J. Neidigh, Crown Point, Ind., assignor to Products Research and Development Corporation, Gary, Ind., a corporation of Indiana
Filed Nov. 26, 1962, Ser. No. 239,883
9 Claims. (Cl. 83—498)

This invention relates to portable machines which are designed to rest on a floor or similar surface while in operation and more particularly to such portable machines which utilize parallel power-driven shafts bearing co-operating rotary tools positioned in fixed relation to one another, such as slitting or shearing machines using rotating knives acting on opposite surfaces of sheet metal.

There is a substantial need, in sheet metal shops and similar locations, for machines of a portable nature for such operations as dividing standard-width sheet metal strips into two or more narrower widths. As is well known, sheet metal, in the form of sheets or rolls, is provided by mills in standard widths. In large-volume fabrication installations, in the nature of factories, the standard widths provided by the mills are cut to desired widths for particular uses by trimming the standard-width material, or by dividing a large width into a number of smaller widths. These operations are performed on a slitting machine, in which the strip or sheet is passed through the machine to produce a cut along the desired line or lines, in a manner externally (but not internally) resembling the passing of plywood, bar metals, plastics, etc. through a machine saw. These operations are performed in a type of tool known as a rotary slitter or slitting shear. Such a slitter, unlike a saw or similar tool, has no single cutting edge, but employs one or more sets of shearing tools, these being essentially square-edged hardened cylinders or rollers rotating on spaced parallel axes, laterally displaced with respect to each other, and of such diameter as to provide a very slight overlap in their circular configurations. The mutually facing end surfaces of the rollers or cylinders (i.e., mutually facing in the small region of the overlap) are extremely closely adjacent to each other, thus producing, when the sheet metal is passed between the rollers, a shearing action comparable to that produced by a pair of shears. The closer the spacing, of course, the sharper the cutting action. Unless the two rollers (commonly called "knives") are extremely close together, the edges of the resultant strips will be deformed, and the thickness of material which can be slitted is severely limited. For similar reasons, the opposed faces must be kept exactly parallel at all times.

Machines of this general type have long been in use in various forms in high-volume factory production of sheet metal articles, such as heating ducts, gutters, and similar building supplies. However, such machines have not in general been considered practical for use in small sheet metal shops and similar installations doing work on a small-volume "custom" basis, where the cost, and the space required, for the elaborate housings or carriages used to provide the high stability required for maintenance of accurate positioning of the knives has been prohibitive. Prior to the present invention, attempts had been made to design such machines of sufficiently low cost, occupation of space, and portability, to make it practical to use such machines in occasional use in place of the manual shear and other tools which are commonly used in such installations, but prior to the present invention, no fully satisfactory machine for such purposes had been devised. There have been commercially marketed machines of lighter and lower-cost construction than those in normal use in permanent-type installations, with the aim of affording sufficient portability to permit convenient storage in a suitable location, and bringing to a work-place for occasional use; but the stability of machines heretofore devised for such purposes has been inadequate to permit the successful construction of such machines for the slitting of sheets or strips of the large widths (four feet or more) which are most economical to use. Fabrication from materials of great width is often desirable both as regards cost of the sheet material as delivered by the mills and as regards the formation of large structures such as heating ducts by appropriate bending operations, rather than the joining of individual panels.

The present invention flows from experimentation with simplified forms of machines, and study of the causes of unsatisfactoriness of operation, thus permitting the elimination of many factors of cost and weight heretofore believed necessary for satisfactory operation, and enabling the producing of low-cost portable slitting machines capable of giving long-lasting performance comparable to that of the much more elaborate machines heretofore known. The principles of the invention, as will hereinafter be seen, may be applied not only to slitting machines but also to other portable machine tools for different purposes, where the problems encountered may be generally similar.

In the experimentation which led to the present invention, attempts were made to simplify the structure of a slitting machine by devising suitable low-cost lightweight carriages for support of the parallel shafts. It was found that fairly simple carriage structures, consisting of side frame members supporting the shaft bearings and a main interconnecting transverse member consisting of a channel-shaped member, supported by a framework of angle irons forming legs, braces, etc., in the manner conventional for production of structural rigidity, could be constructed to permit fairly successful use with sheet metal stocks of widths up to about three feet, particularly if the sharpness and cleanness of cuts were to be slightly sacrificed by spacing the knives of each set slightly apart. However, when it was attempted to extend this type of construction to widths of the neighborhood of four feet, it was found that attempts to produce reasonably clean cuts by the required close spacing of the knives would result in serious damage to the knives if the device were not extremely carefully levelled by adjustment of the legs before operation each time it was removed from its place of storage and placed on a floor for use, unless the floor surface were one especially prepared and levelled, or unless the machine were placed in exactly the same location after once having been adjusted.

Obviously, such a machine, like any machine supported on legs or similar supports, must rattle and vibrate to a substantial extent if placed on a floor without proper adjustment of the legs or shimming to produce equal weight distribution if the floor is of normally uneven character. The provision of special level surfaces, or the requirement of placing such a machine in identical locations each time of use, renders the entire purpose of the portability self-defeating, since the reservation of a particular area for such use is almost as prohibitive as permanent installation, in shops and similar locations where space is at a premium. In many known types of machines of a portable or semi-portable nature, provision is made for leg-levelling, the necessity of which is readily detected by obviously audible rattling and vibrational noise when power is applied to the machine. In the present type of machine, however, it developed that the effects of even brief periods of operation of the machine to permit adjustment of the legs to eliminate the vibration could produce serious damage to the machine. It was found that the placing of the knives in the desired close juxtaposition would, if the machine were turned on without previous exact adjustment of the legs, produce prompt and rapid wear, chattering, and frequently virtual destruction, of the knives, even in the relatively short time before turning off the machine upon observance of the audible indications of improper levelling. The addition of further braces and dimensional increases of the members of the existing carriage structure were found to be capable, upon sufficient rigidizing of the carriage, of preventing this damage, but this result could not be achieved in such a manner without increasing the base or carriage structure to a point of complexity, weight and cost again making such a machine prohibitive for the intended uses. The practical requirements of such a machine do not permit reliance on cautioning of purchasers concerning the dangers of applying power prior to adjustment of the supports; in addition to the fact that the intended users of such machines cannot practically be confined to trained personnel who may be relied upon to abstain from applying power to the machine until levelling has been accomplished, it is found that the procurement of proper levelling without using the vibrational noise as an indicator, i.e., the achievement of fully exact levelling without first turning on the machine, is, in this machine as in others, extremely difficult.

In the experimental and theoretical work leading to the invention, the observed phenomenon of rapid deterioration or destruction of the knives in case of the application of power before exact adjustment of the legs was made the subject of close study. It is of course fairly obvious that the vibrational noises, etc., associated with inadequate leg-levelling of any machine supported at four points on an irregular floor result from the fact that firm support is achieved only at two diagonally opposite corners, thus forming a "rocking" axis about which the vibration occurs, the other two legs alternating in their contact with the floor. A completely rigid structure will of course move as a unit. However in the absence of complete rigidity, it was observed that the effects of inertia produce a torque about an axis connecting one side of the machine with the opposite side. Where the machine is of great length in one direction as compared with the other (as in the case of the four-foot slitter designed to occupy a minimum of space) the torque forces for any given absolute misadjustment (gap between one leg and the floor when the other three legs are in solid contact with the floor) become extremely high about this axis. When the system as described above, with parallel shafts supported in the ends of such a machine, is studied with respect to the effects of such torque, the reason for the damage to the knives under these conditions becomes understandable. The deformation of the carriage in response to torque about the longitudinal (width) axis produces a relative twisting of the shafts which, although they may be held substantially parallel at their ends by their bearings, become slightly non-parallel at their centers, and the rollers thereon, upon the occurrence of such deformation, no longer have their surfaces exactly parallel with the same spacing as previously, there occurring a cocking or relative tilting which, depending upon the direction of such deformation, places one or the other of the knife edges in contact with the side surface of the other knife, and the characteristic vibration of an unevenly supported machine accordingly rapidly alternates this condition of undesired contact if the knives are very closely spaced and parallel in their original preset condition. This effect may best be visualized from a qualitative standpoint by demonstration by means of construction of a simple model illustrating the effects involved. Such a demonstration also shows that even if the vibration and rattling are eliminated, as may be done by adjustment of a single leg, the desired quietness of operation may be a false indicator of optimum operation, since such adjustment may produce stability at a point of slight deformation, thus making it impossible to establish the desired relative positioning of the knives.

The finding of the source of the difficulty has enabled, in accordance with the present invention, the provision of machines of this general type which obtain essentially the same performance as a permanently installed machine with a large and complex bed or carriage, but at a much lower cost and with a minimum of weight, since the type of carriage design which flows from these findings is radically different from constructions heretofore used for analogous purposes. The discovery that the "rigidity" which is critical to proper operation of such a machine is primarily rigidity against torque forces between the end bearing supports permits the elimination of most of the structural members heretofore thought necessary for "rigidity," and the provision of a structure of a very simple type providing the "rigidity" of the specific nature now found to be actually required. It is of course well known in other fields that very great torque resistance (or transmission) can be obtained, for any given cost and weight, by a construction employing a rigid tube having its ends secured to the members between which rotational motion is to be prevented. Analysis of the type of slitter described above shows that the structural member interconnecting the end frames is subjected to practically no loading whatever due to the requirement of supporting weights beyond its own, nor is there any substantial bending stress applied to this member in the operation of the slitting knives, even with relatively thick work materials, such stresses being applied substantially solely to the shafts, once the cut is started. Thus most of the braces and added reinforcement normally associated with a generally "rigid" or "strong" housing or carriage represent useless excess in the operation of a slitting machine (or any other machine which will be seen, now that the above analysis has been presented, to have similar sources of "rigidity" requirements). A simple tube, properly selected for torque characteristics in accordance with principles well known in other applications, readily equals, and in fact excels, the massive supports and braces normally supposedly associated with requirements of rigidity in machinery for these and similar purposes. In the construction of a specific embodiment hereinafter to be described, a four-foot slitter employs as the sole cross-support between the shaft bearing sides a single tube or pipe having a torque resistance of approximately 10 times that of a channel beam (a commonly used form of cross-member) of the same weight, and of the order of 3 times the torque resistance of a solid rod (another form frequently used for "rigidity"). The cross bracing and heavy construction commonly supposed to be required for "rigidity" is completely eliminated, thus producing a light-weight overall carriage consisting essentially entirely of the end frames for the bearings, supported by appropriate legs, and interconnected substantially solely by the tube.

The structure just described is made and assembled, in accordance with the invention, in a very simple manner, the ends of the tube being merely force-fitted onto appropriate bosses formed on the end frames, and locked in place by a simple tie-rod extending through its interior, so that the frictional coupling provided by the force fit is not relaxed by longitudinal loosening of the joints at the ends of the tube. It will be noted, in connection with this construction, that the tie-rod itself performs no function as regards direct torque resistance, merely serving as a simple and convenient manner of locking the frictional torque coupling of the pipe or tube to the end frames.

The embodiment of the invention to be described incorporates the principles described above. Although the principal object of the invention in providing a high-performance low-cost lightweight machine is accomplished primarily in the manner set forth above, it will further be seen that substantial contribution is made to this object by various other features of construction of the embodiment illustrated in the drawing and described below.

In the drawing:

FIGURE 1 is a top plan view of a slitting shear machine incorporating the present invention;

FIGURE 2 is a front view in elevation, partially broken away in section, of the machine of FIGURE 1;

FIGURE 3 is a sectional view taken along line 3—3 of FIGURE 2;

FIGURE 4 is a fragmentary enlarged sectional view taken along line 4—4 of FIGURE 3;

FIGURE 5 is a side elevation of the machine; and

FIGURE 6 is a fragmentary enlarged sectional view illustrating the manner of attachment of the knives to the shafts, taken along the line 6—6 of FIGURE 2.

The illustrated machine 10 includes a carriage 12 which stands on four supporting legs 14a and 14b, which in turn rest on a floor or similar surface 15, rubber tips 15a being provided on the legs. The legs 14a and 14b support the front and rear corners of the carriage, respectively, and each is angled outwardly from the vertical in both the lateral and transverse directions to produce greater mounting stability for the structure, the front legs 14a being curved forwardly and downwardly to rest on the floor substantially forward of the carriage, as best seen in FIGURE 5. Carriage 12 has vertically extending rectangular end frames 16 and 18. Extending horizontally between these end frames are an upper shaft 20 and a lower shaft 22. These shafts are journalled within the respective end frames, being in horizontal parallelism in a vertical plane. Secured to each shaft are circular cutting knives in sets, each set comprising a knife mounted on each shaft. In each set of knives, for example set 26 consisting of knife 27 on the upper shaft and knife 28 on the lower shaft, the knives are square-edged annular cylinders of diameter very slightly greater than the center-to-center spacing of the shafts, and are mutually offset in lateral position to produce a region in which there is a small (one-sixteenth inch or less) overlap, with very small clearance between the edge 29 of the upper knife 27 and the facing edge 30 of the lower knife 28, the edges of the knives cooperatively producing smooth shearing action by pressure on opposite surfaces of sheet metal being passed therebetween. In the machine shown, there are provided two such knife sets 26 and 31, but it will be obvious that there may be any desired number of sets installed on the shafts to produce any desired cutting of a sheet of metal passed through the machine.

Mounted on the end frames a short distance (just sufficient for clearance of the knife, and accordingly substantially smaller than the distance between shafts, as may be seen in FIGURE 3) below the lowermost shaft and parallel thereto to complete the carriage 12 is a torsion-resistant bed structure 32 consisting of a pipe or tube 33 of suitable metal such as steel, firmly secured to both end frames, in a manner later to be described. Mounted on bed structure 32 on suitable mounting brackets 34 is an electric drive motor 36. The motor output shaft 37, through chain-and-sprocket drive 37a (illustrated more or less schematically, with chains, etc., omitted in FIGURE 2) adjacent one end support frame 16, and provided with a guard cover 38, serves to rotate the upper and the lower shaft in opposite directions, as indicated by arrows in FIGURE 3. Supported by the end frames is a horizontally forwardly extending feed table 40, the upper surface of which is in the horizontal plane substantially tangent to the respective knives of knife sets 26 and 31. The table 40 is secured at its sides to guide bars 41, the rearward portions of which are mounted in slots in the inner surfaces of the end frames, these bars serving as guides for the work-material.

The configuration of end frames 16 and 18 is substantially rectangular in side view, each frame being cast of suitable metal such as steel. From the lower corners of the rectangle formed by each frame extend integrally formed leg-mounting sockets 42. Each of these leg-mounting sockets extends at an acute angle from the frame rectangle in both the lateral and front-to-rear directions. In the front-to-rear direction these leg sockets are angled toward a point of convergence between shafts 20 and 22 at about the slitting area, thus directing vibrational and similar stresses on the legs in the direction of their extension from the carriage. Each socket is threaded at 48 at its lower end so that an individual mounting leg 14a or 14b may be screwed in or out for adjustment and firmly secured, locking nuts 49 being provided for this purpose.

Extending inwardly of the rectangular inner surface 50 of each end frame a clearance distance (i.e., a distance smaller than the distance between the shaft centers, but slightly greater than the radius of the lower knives) below the lower cutting knives there is affixed a frusto-conical tube-mounting member 56. Each member 56 is integrally cast or secured as by welding to the support frame and terminates at a shoulder 58 formed by the surface of a boss 60 on surface 50. The smaller circumference end 62 of the frusto-conical member 56 has an outside diameter very slightly smaller than the inner diameter of bed structure tube 33 so that the tube may be readily fitted onto the outer conical surface 64 of member 56 in assembly.

When assembling tube 33 into the machine structure, the tube is press fitted in a suitable manner onto frusto-conical surfaces 64 (normally in substantial abutment against shoulder 58, the clearance and flare being exaggerated for clarity of illustration in FIGURE 4). To lock tube 33 in place against vibration, a through tie bolt 66 is passed through a clearance opening 68 in end frame 16, through a recess 69 in frusto-conical member 56, through the open bore 70 of tube 33, through an identical recess in the opposed frusto-conical member and finally through a suitable clearance opening in the end frame 18 on the other side. The tie bolt is threaded at each end 77, and these ends protrude from the outer side of each end frame. Suitable nuts 76 are fastened to the threaded ends 77 and are tightened to lock the forced fitting of tube 33 on the tube mounting members and to rigidly stabilize the entire structure.

Having its ends secured by suitable screws to the front edges of the frame members 16 and 18 is a sheet-metal finger guard 78, of which the lower end 79 is bent angularly rearwardly to terminate a small distance above the inner end of table 40, thus forming a narrow slot 80 closely adjacent to the working region of the knives and guiding the end of a work-piece into proper location to be seized and slitted and passed out the back of the machine.

The manner in which the knives are mounted on the shafts is illustrated in FIGURE 6. As there seen, the knife 28 is an annular ring having a radial bore with the outer portion 82 internally threaded, and with the inner portion 84 enlarged. Seated in the enlarged portion 84 of the bore is the head portion 86 of a gib key 88 having a stem 90 extending out into the smaller portion 82 of the bore. A set-screw 92 with a socketed end is threaded into the bore and tightened to clamp the gib head 86 on the shaft. It will be seen that the knives may be readily set to slit the work at any desired distances from either of the guides 41. Either member of a set is slid to proper position as shown by measurement of distance from the desired side guide (a rule or gauge for this purpose may be secured to the machine), and the gib-locking screw 92 is tightened; because of the great rigidity against torque of the transverse member of the carriage, despite its relatively light weight and low cost, the second member of the set may be properly positioned by merely sliding it into abutment (at the small contact point) against the first, and then tightening its gib-clamping mechanism. The stability of this type of carriage against torque is sufficient so that adjustment in this simple manner (which of course produces the most desirable cutting action) may be made, without the necessity of using shim gauges or similar devices, as is required where a gap must be left to provide clearance to prevent injury to the knives where deviations in relative position must be accommodated, as with lightweight carriages of previously known constructions.

When sheet metal is to be slitted in machine 10, the machine is brought onto the floor and positioned with legs 14a and 14b resting on the floor in a conventional manner, any required leg adjustment being made for unevenness of the floor. Motor 36 is energized to rotate the knives in the directions indicated by the arrows in FIGURE 3. The sheet metal to be slitted is placed on table 40 and guided toward the cutting area. The sheet is pushed at its rearward edge along table 40 and the forward end of the sheet passes through knife sets 26 and 31 and the material is sheared along the lines of the facing edges of the upper and lower knives of each set. Each metal sheet is passed through the machine and passes out at the rear in the form of a plurality (3 in the present instance) of separate narrow sheets.

While there has been described what is at present thought to be a preferred embodiment of the invention, it will be understood that various modifications may be made therein and it is the intention to cover in the appended claims all such modifications as fall within the true scope of the teachings of the invention.

What is claimed is:

1. A portable machine comprising: a plurality of horizontal parallel rotatable shafts, rigid support members at opposed ends of said machine, said support members rotatably mounting the ends of said shafts, mating cutting tools independently mounted on the respective shafts in the region thereof substantially removed from both support members, leg members extending from said support members and rigidly affixed thereto at the opposed ends of said machine for resting said machine on a floor, and a single circular tubular bed of substantially uniform diameter extending between the opposed ends of said machine, said tubular bed being secured to the support members at the opposed ends of said machine for resisting torsional forces tending to distort said shafts, said tubular bed comprising substantially the entire torque resistant support structure between the opposed ends of said machine.

2. A portable machine as claimed in claim 1, in which the tubular bed is spaced from the closest shaft by a distance substantially smaller than the distance between shafts.

3. A portable machine as claimed in claim 1 which includes male members extending from the rigid support members toward one another, the ends of the tubular bed being forced onto said male members to rigidly secure said bed to said support members, and a tie member connecting the support members and maintaining the forced-on engagement to lock the joints at the ends of the tubular bed.

4. A portable machine including a plurality of horizontally extending parallel tool-guiding members, rigid end support frames bearing the ends of the tool-guiding members, mating tools independently mounted on respective tool-guiding members and substantially adjustable in position therealong, support means for resting said machine on a floor surface, a single tubular bed of subsantially uniform diameter and of greater rigidity than the tool-guiding members comprising substantially the sole structural torque-resistant member spanning the distance between end frames, and anchoring means rigidly securing said tubular bed to said end support frames, the tubular bed being closer to the nearer of the tool-guiding members than the tool-guiding members are to each other.

5. A portable metal working machine comprising: a plurality of horizontally extending rotatable shafts, end supports journalling said shafts in parallel spaced relation at different vertical levels, mating tool members independently mounted on the respective shafts in the region substantially spaced from the end supports, a plurality of individual legs protruding from said end supports for resting said machine on a floor, a torsion-resistant rigid-walled tubular bed joined to said end supports and comprising substantially the sole structural member adjoining said end supports, frusto-conical members fixedly secured to said end supports adjacent the protrusion of said legs, and means securing said tubular bed onto said frusto-conical members to rigidly secure said tubular bed to said end supports to provide a simple and light machine structure resistant to torsion which would tend to change the shaft spacing.

6. A machine as claimed in claim 5, in which said securing means comprises a rod extending through the bore of said tubular bed and through said end supports, and means fastening said rod to said end supports to rigidly stabilize the machine structure.

7. A machine as claimed in claim 5, in which said tubular bed is affixed to said end supports below said horizontal shafts a minimum clearance distance below a lower one of said shafts.

8. A portable machine tool comprising a plurality of horizontal parallel tool-guiding members, mating tools independently mounted on the tool-guiding members for substantial sliding adjustment of position thereon, rigid support members bearing the ends of said tool-guiding members at differing heights, a circular tubular carriage member having its respective ends rigidly secured to the support members and extending between the support members parallel with the tool-guiding members, and means for supporting the tubular carriage member and the end-support members on a floor or similar supporting surface, the tubular carriage member comprising substantially the sole torque-resistant structure extending between the opposed ends of the machine, and being closer to at least one of the tool-guiding members than the tool-guiding members are to each other.

9. A portable machine tool comprising upper and lower horizontal parallel shafts, each shaft bearing a tool member cooperating with a tool member on another shaft, rigid end members rotatably supporting the shafts, the tool members being independently mounted on the respective shafts for substantial sliding adjustment of position between the end members, means for supporting the end members on a floor or similar support surface, and a single circular tubular carriage member connecting the end members and having its ends rigidly affixed to the end members closely beneath the lower shaft and comprising substantially the sole torque-resistant structure extending between the end members, whereby the relative positions of the tool members may be exactly maintained despite variations in evenness of support surfaces, with a carriage of relatively light and simple construction.

References Cited by the Examiner

UNITED STATES PATENTS

| 839,275 | 12/06 | Doub | 83—425 |
| 1,426,327 | 8/22 | Tiffany | 248—13 X |
| 1,504,678 | 8/24 | Dickey et al. | 248—13 |
| 1,798,340 | 3/31 | Thewes | 153—32 |
| 1,873,792 | 8/32 | Sheeler | 83—426 X |
| 2,328,582 | 9/34 | Ratchford et al. | 225—100 X |
| 2,377,130 | 5/45 | Cohen | 83—430 X |
| 2,964,075 | 12/60 | Goldschmidt et al. | 144—1 |
| 3,126,780 | 3/64 | Booth | 83—443 X |

FOREIGN PATENTS

| 178,005 | 11/05 | Germany. |

ANDREW R. JUHASZ, *Primary Examiner.*

WILLIAM W. DYER, Jr., *Examiner.*

UNITED STATES PATENT OFFICE
CERTIFICATE OF CORRECTION

Patent No. 3,195,388            July 20, 1965

Robert J. Neidigh

It is hereby certified that error appears in the above numbered patent requiring correction and that the said Letters Patent should read as corrected below.

Column 8, line 4, for "adjoining" read -- joining --.

Signed and sealed this 28th day of December 1965.

(SEAL)
Attest:

ERNEST W. SWIDER            EDWARD J. BRENNER
Attesting Officer            Commissioner of Patents